(12) United States Patent
Slaton

(10) Patent No.: US 11,130,560 B2
(45) Date of Patent: Sep. 28, 2021

(54) BURNTHROUGH RESISTANT FLOOR PANELS AND METHOD OF MANUFACTURING AND INSTALLATION

(71) Applicant: THE BOEING COMPANY, Chicago, IL (US)

(72) Inventor: Daniel B. Slaton, Renton, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 16/044,622

(22) Filed: Jul. 25, 2018

(65) Prior Publication Data
US 2020/0031450 A1 Jan. 30, 2020

(51) Int. Cl.
*B64C 1/40* (2006.01)
*B64C 1/00* (2006.01)
*B64C 1/18* (2006.01)
*B64D 45/00* (2006.01)

(52) U.S. Cl.
CPC .............. *B64C 1/40* (2013.01); *B64C 1/00* (2013.01); *B64C 1/18* (2013.01); *B64D 45/00* (2013.01); *B64C 2001/0072* (2013.01); *B64C 2001/0081* (2013.01); *B64D 2045/009* (2013.01)

(58) Field of Classification Search
CPC .... B64C 1/00; B64C 1/18; B64C 1/40; B64C 2001/0072; B64C 2001/0081; B64D 2045/009; B64D 45/00
USPC ........................................................ 244/119
See application file for complete search history.

(56) References Cited

U.S. PATENT DOCUMENTS

| 4,557,961 A * | 12/1985 | Gorges | B32B 3/12 428/117 |
|---|---|---|---|
| 7,632,766 B2 | 12/2009 | Erb, Jr. et al. | |
| 7,767,597 B2 | 8/2010 | Garvey | |
| 8,314,202 B2 | 11/2012 | Emrick et al. | |
| 8,450,226 B2 | 5/2013 | Lewis | |
| 8,607,928 B2 | 12/2013 | Richardson, III et al. | |
| 9,056,666 B2 | 6/2015 | Richardson, III et al. | |
| 9,272,169 B2 | 3/2016 | Ono et al. | |
| 9,643,711 B2 | 5/2017 | Richardson, III et al. | |
| 9,708,052 B2 | 7/2017 | Contzen et al. | |
| 9,919,790 B2 | 3/2018 | Contzen et al. | |
| 2006/0121808 A1* | 6/2006 | Kai | B32B 21/10 442/138 |
| 2013/0210303 A1* | 8/2013 | Doi | B32B 27/32 442/67 |
| 2015/0069068 A1* | 3/2015 | Hariram | A62C 3/16 220/560.01 |

(Continued)

OTHER PUBLICATIONS

Appendix F to Part 25 of 14 C.F.R. 25.856, pp. 581-596., retrieved by Examiner Brown from https://www.govinfo.gov/content/pkg/CFR-2011-title14-vol1/pdf/CFR-2011-title14-vol1-chapI-subchapC.pdf on Jul. 30, 2020. (Year: 2011).*

*Primary Examiner* — Claude J Brown
(74) *Attorney, Agent, or Firm* — Coats & Bennett, PLLC

(57) ABSTRACT

Aspects of the present disclosure present floor panels and floor panel assemblies that include incorporated burnthrough resistant materials and/or include burnthrough resistant layers applied to floor panels used in floor panel assemblies, along with methods for inhibiting fire penetration into compartments and methods of making and installing burnthrough resistant floor panels and floor assemblies including such apparatuses and methods as they relate to vehicles, including aircraft.

27 Claims, 6 Drawing Sheets

(56) References Cited

U.S. PATENT DOCUMENTS

2015/0190973 A1\* 7/2015 Martin .................. C04B 28/005
156/60
2019/0309511 A1\* 10/2019 Bruins .................... B32B 5/028

\* cited by examiner

BURNTHROUGH RESISTANT FLOOR PANELS AND METHOD OF MANUFACTURING AND INSTALLATION

TECHNOLOGICAL FIELD

The present disclosure relates generally to the field of supports comprising fire resistant materials, especially those that must comply with general aviation burnthrough standards and regulations. More specifically the present disclosure relates to the field of burnthrough resistant materials.

BACKGROUND

In the field of aviation, safety guidelines exist regulating, for example, the minimum time required for fire penetration into environments inhabited by passengers (e.g. the passenger cabin, etc.). For example, Federal Aviation Regulation (FAR) 25-856(b) as released in 2003, sets forth the Federal requirement standards (14 C.F.R. § 25.856) in the U.S. for providing safety equipment to aircraft to retard the penetration of an external fire through the fuselage and into the airplane cabin, commonly referred to as "burnthrough". To satisfy this requirement, manufacturers have customized thermal and/or acoustic insulation blankets located proximate to the interior of lower fuselage sections. The addition and/or customization of such aircraft fuselage insulation blankets adds to manufacturing cost in terms of both material and the cost associated with the installation, inspection, repair and replacement, etc., of such blankets. In addition, added weight to the aircraft can result in lower efficiency, aircraft range, and potentially reduced payloads.

SUMMARY

Aspects of the present disclosure present floor panels and floor panel assemblies that include incorporated burnthrough resistant materials and/or include burnthrough resistant layers applied to floor panels used in floor panel assemblies. Methods for inhibiting fire penetration into compartments and methods of making burnthrough resistant floor panels and floor assemblies including such apparatuses and methods as they relate to vehicles including, for example, aircraft are also disclosed herein.

According to aspects of the present disclosure a burnthrough resistant floor panel is disclosed comprising an internal support structure having internal support structure first ("upper") surface and second ("lower") surface. Skins are configured to substantially cover the internal support structure first surface and internal support structure second surface. Together, the internal support structure and the skins form the floor panel. The floor panel has a first or upper floor panel surface and a second or lower floor panel surface, and a burnthrough resistant layer is located proximate to at least one of the skins that cover the internal support structure first and/or second surfaces. In another aspect, the burnthrough resistant material is otherwise integrated into at least one of the skins.

Further aspects are directed to a burnthrough resistant floor assembly including a floor panel, with the floor panel having an upper floor panel surface and a lower floor panel surface. The floor panel includes an internal support structure having an internal support structure first ("upper") surface and an internal support structure second ("lower") surface. Again, skins are configured to substantially cover the internal support structure first surface and internal support structure second surface. Together, the internal support structure and the skins form the floor panel. The floor panel has a first or upper floor panel surface and a second or lower floor panel surface, and a burnthrough resistant layer is located proximate to at least one of the skins that cover the internal support structure first and/or second surfaces. In another aspect, the burnthrough resistant material is otherwise integrated into at least one of the skins.

According to another aspect, the present disclosure is directed to a method for inhibiting fire penetration into an aircraft compartment. An aircraft compartment includes, for example, a cabin, such as a passenger cabin. The method includes the steps of installing a floor assembly into an aircraft interior. The floor assembly includes a floor panel, with the floor panel comprising an internal support structure having an internal support structure first (upper) surface and an internal support structure second (lower) surface. Skins are configured to substantially cover the internal support structure first and second surfaces to form the floor panel. The formed floor panel has an upper floor panel surface and a lower floor panel surface, and a burnthrough resistant layer is located proximate to at least one of the skins that cover the internal support structure first and/or second surfaces. In another aspect, the burnthrough resistant material is otherwise integrated into at least one of the skins.

According to further aspect, the present disclosure is directed to a method of making a burnthrough resistant floor panel including applying a burnthrough resistant layer to a floor panel. The floor panel includes an internal support structure having an internal support structure first (upper) surface and an internal support structure second (lower) surface. A skin is configured to substantially cover the internal support structure first and second surfaces to form the floor panel. The formed floor panel has an upper floor panel surface and a lower floor panel surface, and a burnthrough resistant layer is located proximate to at least one of the skins that cover the internal support structure first and/or second surfaces. In another aspect, the burnthrough resistant material is otherwise integrated into at least one of the skins.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
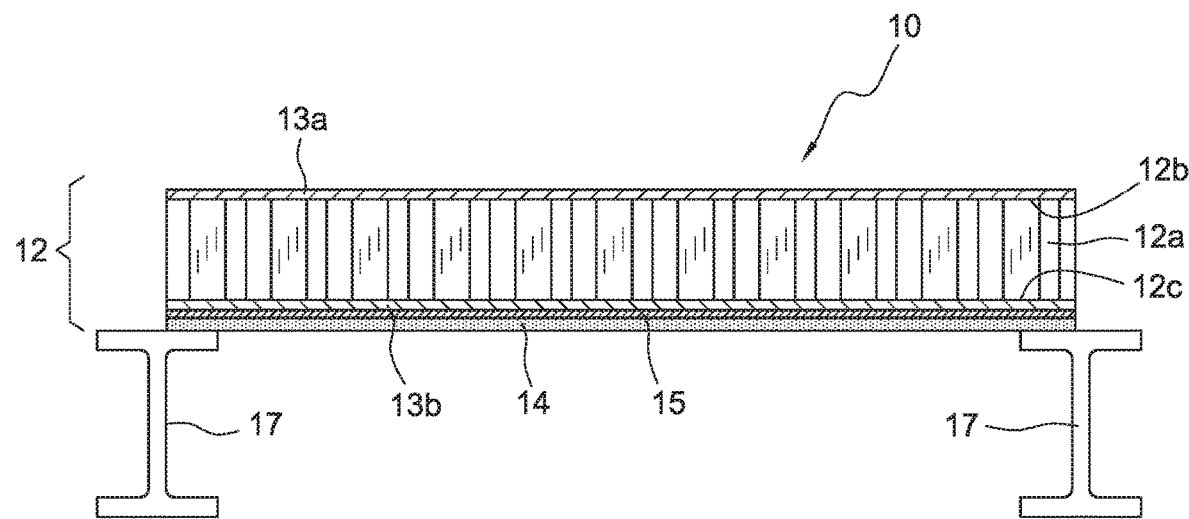
Figure 2A:
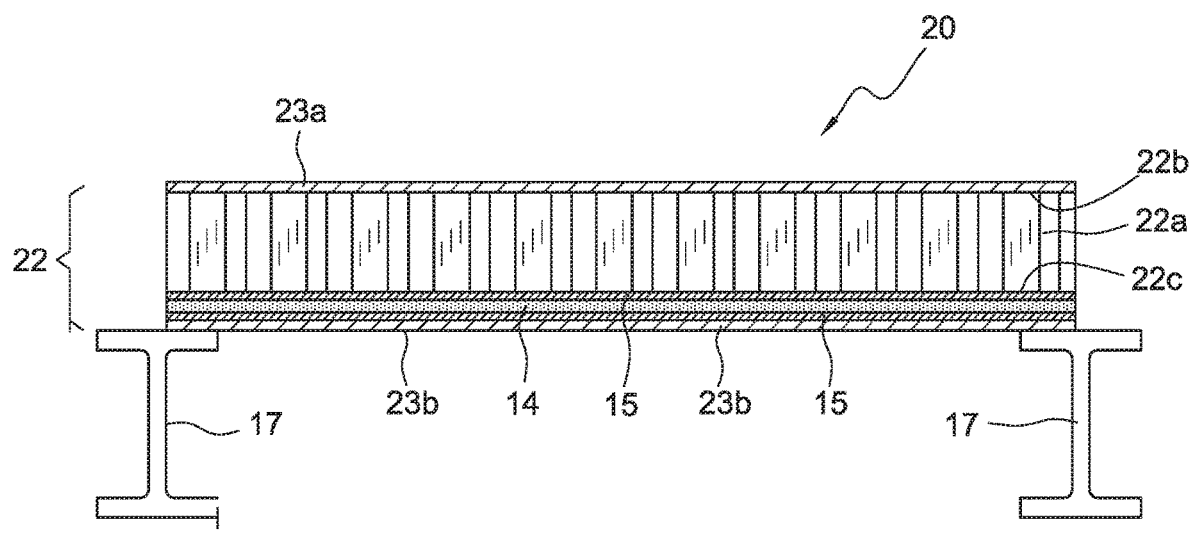
Figure 2B:
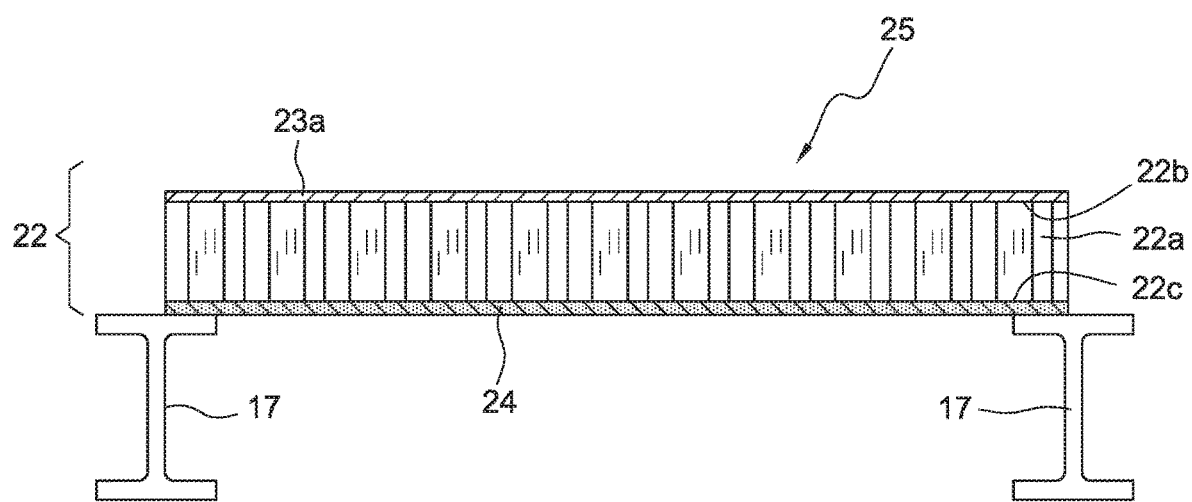
Figure 3:
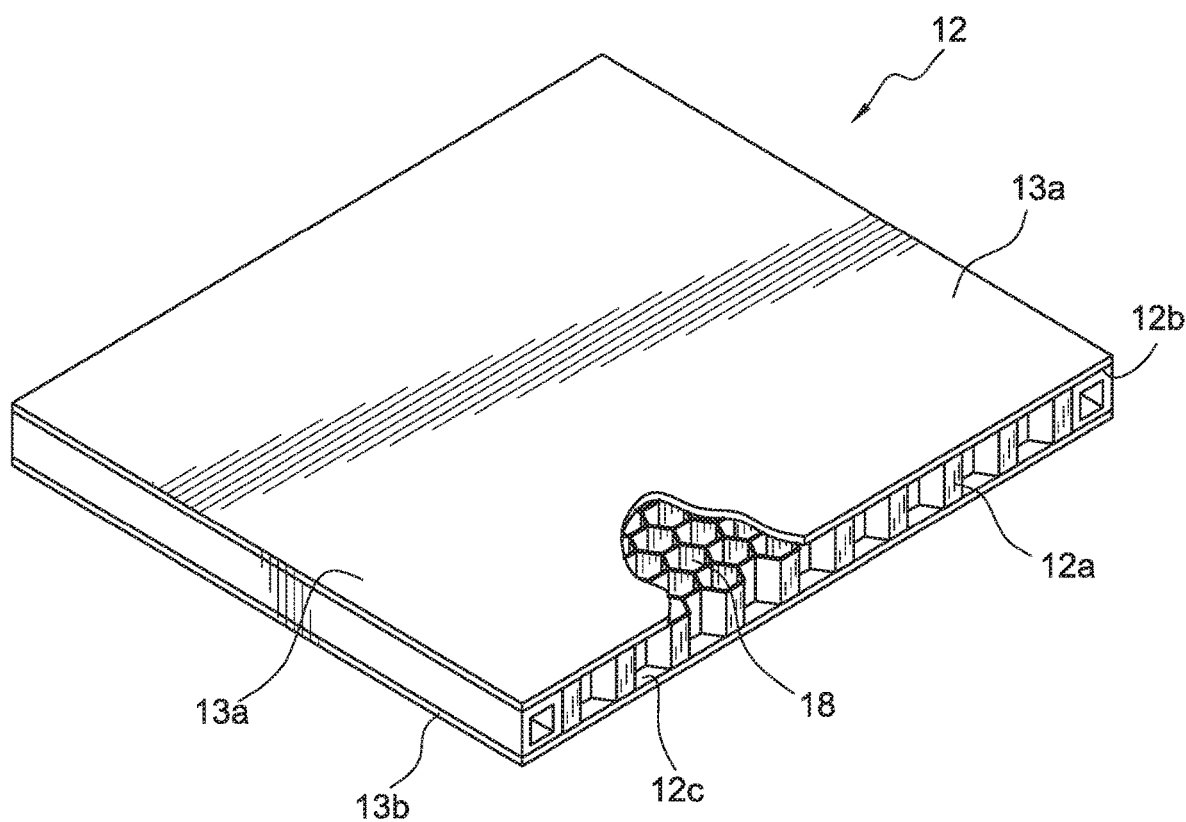
Figure 4:
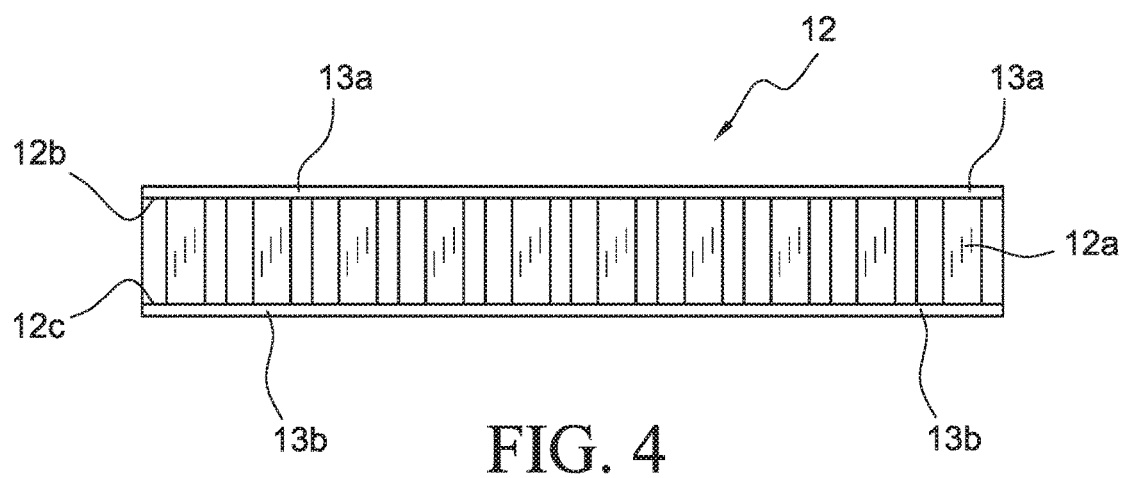
Figure 5:
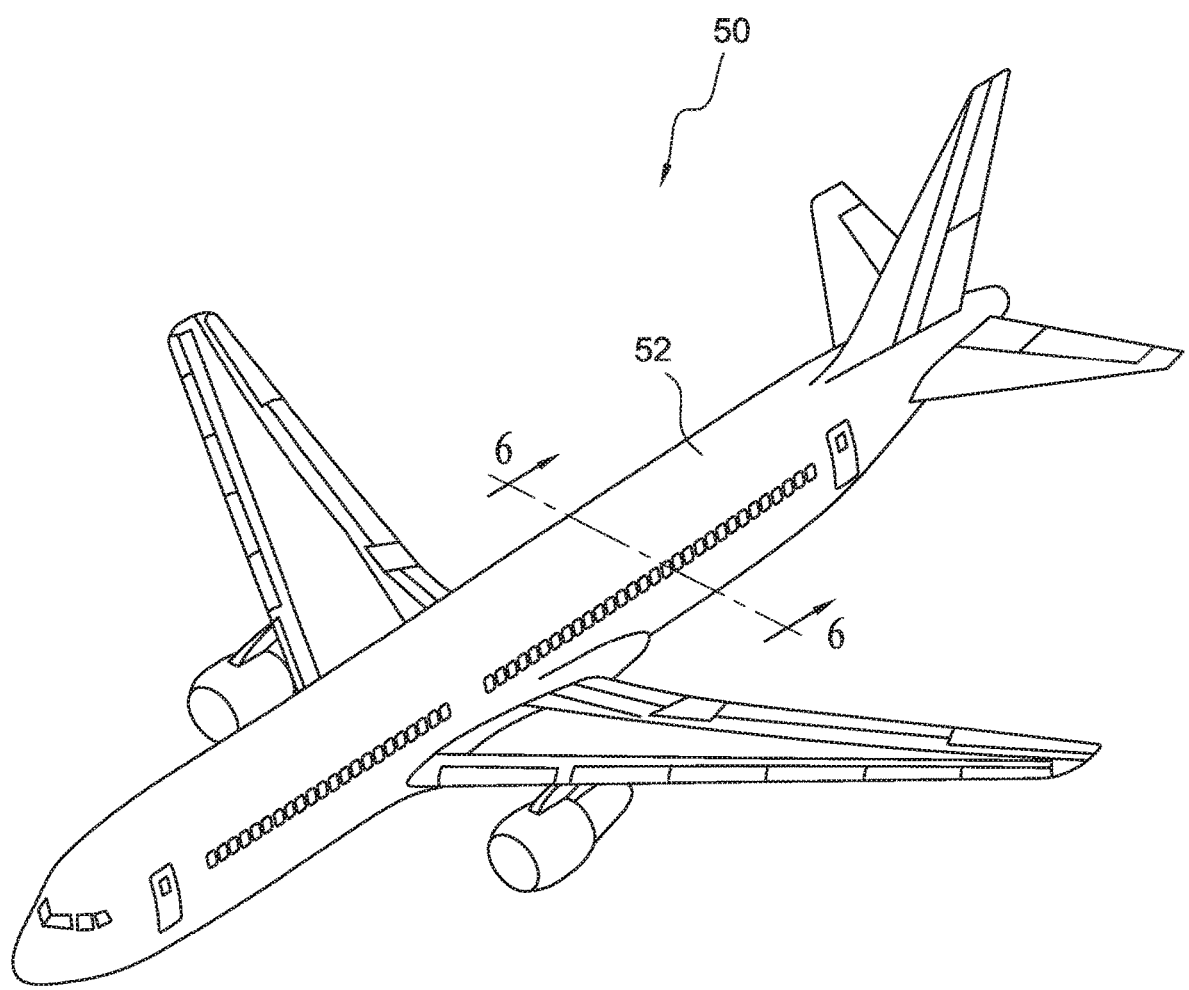
Figure 6:
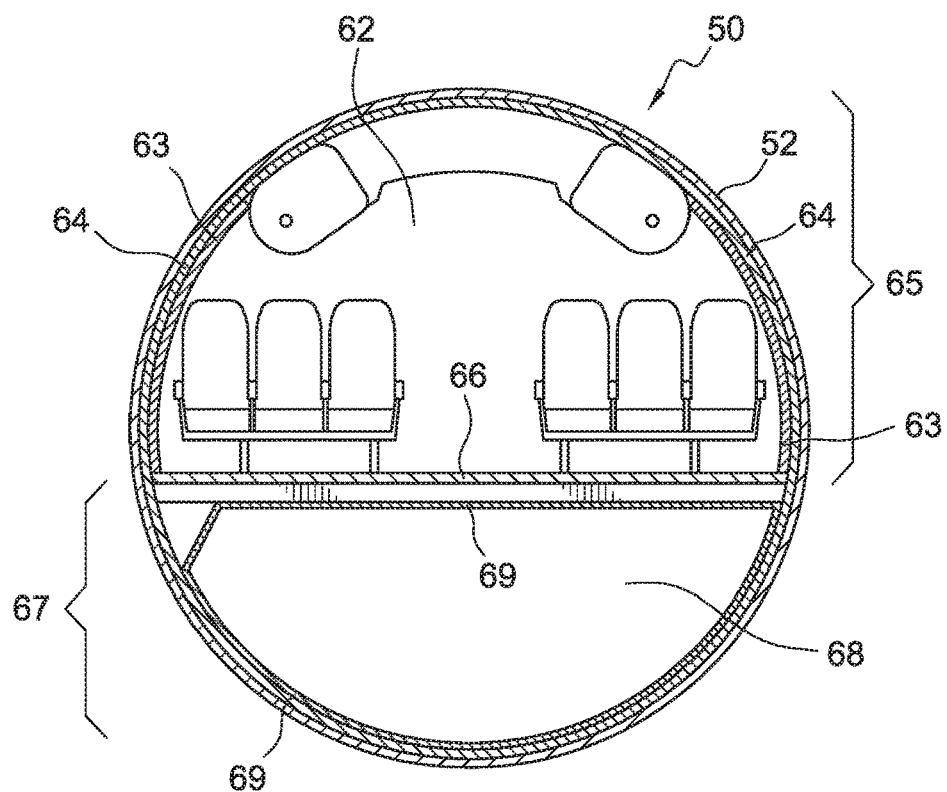
Figure 7:
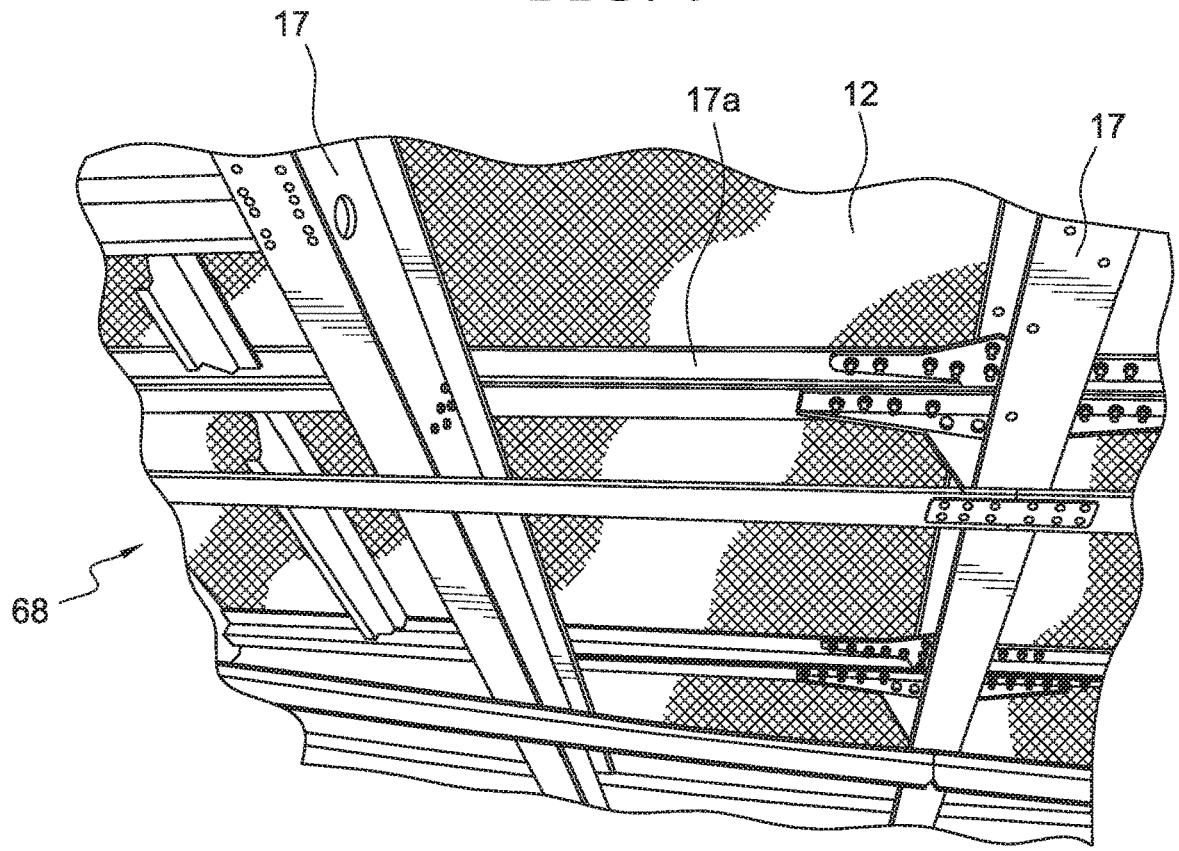
Figure 8:
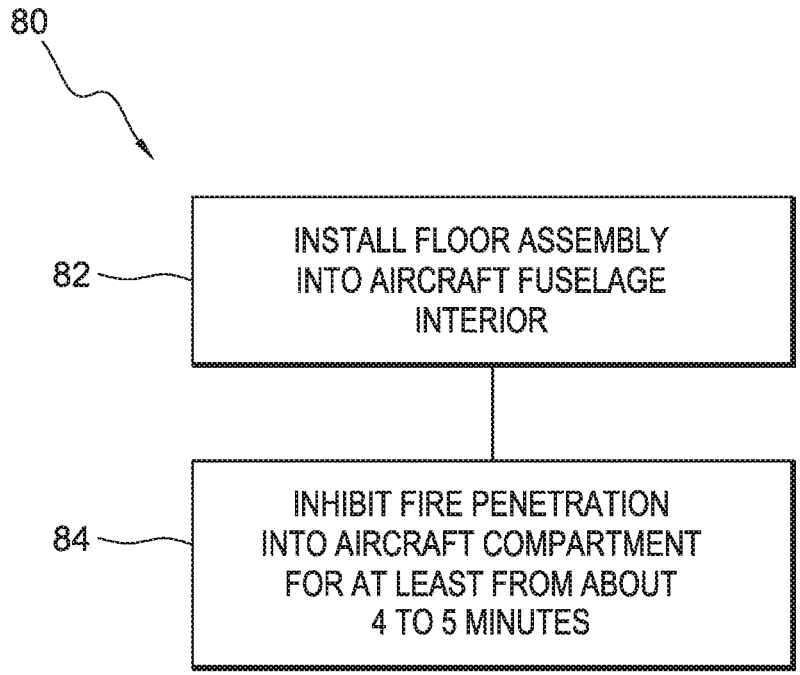
Figure 9:
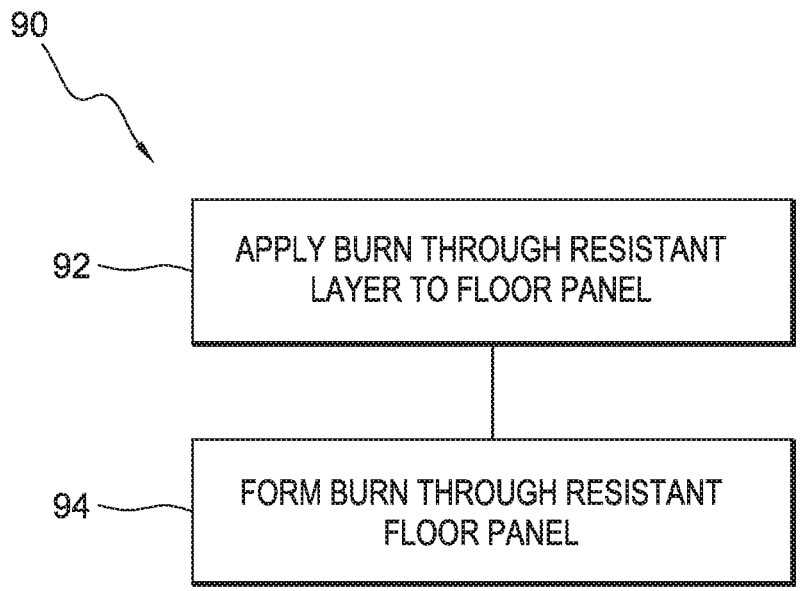

Having thus described variations of the disclosure in general terms, reference will now be made to the accompanying drawings, which are not necessarily drawn to scale, and wherein:

FIG. 1 is an illustration of a perspective representative side view of an aspect of the present disclosure;

FIG. 2A is another illustration of a perspective representative side view of an aspect of the present disclosure;

FIG. 2B is another illustration of a perspective representative side view of an aspect of the present disclosure;

FIG. 3 is a partially exposed perspective view of a floor panel according to aspects of the present disclosure;

FIG. 4 is a cross-sectional side view of a floor panel according to aspects of the present disclosure;

FIG. 5 is a perspective illustration of an aircraft;

FIG. 6 is an exposed front view of a laterally bisected aircraft fuselage showing aspects of the present disclosure;

FIG. 7 is an illustration of a supported floor panel within an aircraft fuselage;

FIG. 8 is a flowchart outlining a method according to an aspect of the present disclosure; and FIG. 9 is a flowchart outlining a method according to an aspect of the present disclosure.

DETAILED DESCRIPTION

According to aspects of the present disclosure, floor panels and floor assemblies and flooring comprising floor panels are presented where the floor panels include a burnthrough resistant layer applied to or integrated within a layer (e.g., an outer layer) of the floor panel. The floor panels further include an internal support structure, equivalently referred to herein as a "core" or "core panel(s)" that include, for example, a honeycomb panel made from a non-metallic material and/or a metal material. When a metal material is present as the core material, the metal can include, for example, aluminum, an aluminum alloy, titanium, a titanium alloy, etc.

According to further aspects, the internal support structure has an internal support structure first (upper) surface and an internal support structure second (lower) surface that are both substantially covered by a facing sheet (equivalently referred to herein as a "skin"). The skin is made from a strong, but lightweight material including, without limitation, a fiber-containing composite material such as glass fiber, boron fiber, aramid fiber, carbon fiber reinforced plastic (CFRP), graphite, etc. Together, the internal support structure and the skin form a floor panel that can be used as flooring in a floor assembly.

The floor panel has a floor panel first surface (e.g. an upper floor panel surface, or top surface) that can be exposed to an open environment to. As defined herein, open environments include, without limitation, rooms, hallways, passenger cabins, compartments, cargo bays, cockpits, etc. The floor panel further has a floor panel second surface (e.g., a lower floor panel surface, or underside). The upper and/or lower surfaces of the floor panel can also be further covered (e.g., the skin of the floor panel can be covered) by an aesthetic covering including, without limitation, paint, tile, carpeting, or other coverings, etc. The floor panel includes an underside surface that can attach to supports of a floor assembly, or otherwise face a surface or components that are not exposed to an open environment. Further, the floor panels can also serve as ceiling or ceiling panels in a compartment situated below the open environment.

In further present aspects, at least a portion of the skin includes at least one layer of burnthrough resistant material resisting a backside heat flux of less than about 2.0 BTU/ft$^2$/sec. for a duration of from at least 4 minutes to about 5 minutes during burnthrough rate testing as set forth in U.S. Federal Aviation Regulation (FAR) 25.856(b), also set forth the U.S. Code of Federal Regulations (14 C.F.R. § 25.856). The material selected for use in the burnthrough resistant layer, as well as the thickness of the burnthrough resistant layer, allow the floor panel that incorporates the burnthrough resistant layer to satisfy at least the minimum U.S. Federal requirements, regulations and standards relating to burnthrough rates of materials used, for example, as components and assemblies that must resist fire penetration into spaces and compartments through, for example, an aircraft fuselage.

According to other present aspects, the burnthrough resistant layer can be applied to at least portions of one of the upper surface or lower surface of the floor panel, or substantially the entire outer surface of the entire floor panel. The burnthrough resistant layer therefore can be applied to an exterior floor panel surface, such as a skin, or other exterior component of a floor panel. In addition, according to other present aspects, the burnthrough resistant layer can be incorporated within other layers, or as a layer within, for example the skin, or other floor panel material. In these aspects, the burnthrough resistant layer may not exist at the exterior of a floor panel surface, and may not exist as a discrete layer, but instead is located within and even throughout the floor panel, or another component layer of a floor panel (e.g., within and/or throughout a skin layer, etc.) at a desired and predetermined distance from an exterior surface of a floor panel.

The burnthrough resistant layer can be applied to components of the floor panel by known application methods including, without limitation, spraying, brushing, rolling, and other layer deposition techniques, as well as the application of the layer as a film, tape, etc. The burnthrough resistant material that forms the burnthrough resistant layer on the floor panel can be applied as a liquid or as a solid, with the burnthrough resistant material including, without limitation, at least one of a film, a coating, a felt material, a tape, etc. including, for example, a ceramic paper or ceramic paper tape, other ceramic material, etc.

According to further aspects, the average overall thickness of the contemplated floor panels can range from about 0.25 inch to about 1 inch, with the floor panel density ranging from about 0.40 to about 1.10 lb/ft$^2$. When the burnthrough resistant layer is located exterior to the skin (e.g., applied to the outer surface of a skin), the average thickness of the skin can range from about 0.0.15 inch to about 0.030 inch, and the average thickness of the thin burnthrough resistant layer ranges from about 0.0025 inch to about 0.008 inch.

According to further aspects, the combination of materials, material densities, and material thickness are selected to form a floor panel such that the floor panel resists a backside heat flux of less than about 2.0 BTU/ft$^2$/sec. with a burnthrough rate (e.g., duration) of from at least about 4 mins to about 5 mins. That is, for a duration of from at least about 4 minutes to about 5 minutes, the floor panel resists the penetration of a backside heat flux through the floor panel of less than about 2.0 BTU/ft$^2$/sec. The combination of materials are selected such that their combined properties at least comply with, and can exceed the FAR 25.856(b) requirements and standards set forth, for example, in 14 C.F.R. § 25.856 (2017).

Further aspects contemplate that the burnthrough resistant layer can be located on the exterior of the upper and/or lower surface(s) of the skin used to make the floor panel. However, the burnthrough resistant material and/or layer can also be, if desired, integrated into the skin (e.g. located at a predetermined average distance from an outer surface of the skin, etc.). Further, the burnthrough resistant material and/or layer can be integrated throughout the internal and external regions of the skin (e.g., impregnated throughout the thickness of the skin). In still further aspects, a burnthrough resistant material or layer is integrated (e.g., impregnated) into the skin material before curing the skin material (e.g., a composite skin material), if such curing is required of the skin material, such that the skin material and the burnthrough resistant material can be co-cured. "Co-curing" refers to processes where the skin material requires curing, but the burnthrough resistant material and/or an applied adhesive associated with the burnthrough resistant material require no curing.

According to still further aspects, the presently disclosed burnthrough resistant layer can be incorporated into an adhesive layer, or an adhesive layer may be provided to the burnthrough resistant layer, or to the skin, by any method including, for example, automated and manual material deposition processes including, without limitation, spraying, brushing, rolling or otherwise depositing the adhesive layer onto the burnthrough resistant layer, etc.

Without limitation, when present, presently contemplated adhesives further include, for example, materials that facilitate thermal bonding, ultraviolet bonding, ultrasonic bonding, or pressure activated adhesives (e.g. pressure-based or pressure-sensitive adhesives, equivalently referred to herein as "PSAs") for the bonding or adhesion of the burnthrough resistant layer to a selected substrate. Without limitation, such adhesives include adhesives familiar in the field of bonding and/or adhering layers associated with, for example, bonding fire-resistant layers, or fire-inhibiting layers, for example, to thermal insulation blankets in aircraft, etc. For example, such adhesives can include, without limitation, polyester-based adhesives, polyvinyl fluoride-based adhesives, silicone-based adhesives, etc. Contemplated adhesives can further incorporate fire retardant additives including, without limitation, antimony compounds, hydrated alumina compounds, borates, phosphates, sulfates, organic halogens, organic phosphates, etc.

Indeed, the present application contemplates that the term "adhesive" refers to any compound able to adhere the burnthrough resistant layer to a desired substrate such that the layer is adhered or bonded during the accepted operation and requirements of the object to which the substrate or substrate assembly (that comprises the burnthrough resistant layer) is adhered, such as, for example, an aircraft operating in conditions encountered during fueling, takeoff, flight, and landing, etc. Contemplated adhesives include adhesives that cure in ambient conditions, or that are said to cure "naturally", or that require no curing.

According to further aspects, the burnthrough resistant layers incorporated into the floor panels include, without limitation, a fire barrier laminate material (referred to equivalently herein as a "fire retardant material" or "burnthrough resistant material") comprising a polymeric flame propagation resistant material including, for example, a laminate. The polymeric flame propagation resistant material includes, without limitation polyesters, polyimides, polyetherketones, polyetheretherkeptones, polyvinylfluorides, polyamides, polytetrafluoroethylenes, polyaryl sulfones, polyester amides, polyester imides, polyethersulfones, polyphenylsulfides, ethylene chlorotrifluoroethylene, etc., and combinations thereof.

The burnthrough resistant layer can further include, without limitation, an inorganic material including at least one of vermiculite, mica, clay or talc, with the inorganic materials having a preferred average particle size ranging from about 20 μm to about 300 μm. In addition, the inorganic materials that display enhanced flame propagation resistant properties can have an aspect ratio ranging from about 50:1 to about 2000:1. In another aspect, the inorganic materials that display enhanced flame propagation resistant properties have an aspect ratio ranging from about 50:1 to about 1000:1. In a further aspect, the inorganic materials that display enhanced flame propagation resistant properties have an aspect ratio ranging from about 200:1 to about 800:1.

Suitable micas for use in the burnthrough resistant layer include, without limitation, at least one of muscovite, phlogopite, biotite, lepidolite, glauconite, paragonite and fluorophlogopite. Mica can be included in the burnthrough resistant layer in an amount ranging from about 20 to about 100 weight percent, based on the total weight of the fire barrier layer. If present, talc can be included in the burnthrough resistant layer in an amount ranging from about 1 to about 50 weight percent, based on the total weight of the burnthrough resistant layer.

Suitable clays for use in the burnthrough resistant layer include, without limitation, at least one of ball clay, bentonmite, smectite, hectorite, kaolinite, montmorillonite, spaonite, sepiolite, sauconite. Such clay components in the burnthrough resistant layer can be included in an amount ranging from about 5 to about 60 weight percent, based on the total weight of the fire barrier layer.

Further, inorganic binders can be present in the burnthrough resistant layer including, without limitation, colloidal dispersions of alumina, silica, zirconia, and combinations thereof. When present in the burnthrough resistant layer, such an inorganic binder can be used in amounts ranging from about 0.1 to about 40 weight percent based on the total weight of the burnthrough resistant layer.

Various organic binders can be included in the burnthrough resistant layer as a solid, a liquid, a solution, a dispersion, a latex or other form, and include, without limitation, acrylic latex, methacrylic latex, phenolic resins, copolymers of styrene and butadiene, vinypyridine, acrylonitrile, copolymers of acrylonitrile and styrene, vinyl chloride, polyurethane, copolymers of vinyl acetate and ethylene, polyamides, organic silicones, organofunctional silanes, unsaturated polyesters, epoxy resins, polyvinyl esters (e.g. polyvinylacetate, polyvinylbutyrate latexes, etc.), etc. Such organic binders, if present, can be included in the burnthrough resistant layer in an amount ranging from about 0.1 to about 40 weight percent, based on the total weight of the burnthrough resistant layer.

The burnthrough resistant layer can further include a water repellant additive or coating including, without limitation, water repellant silicones, metal chloride salts, silanes, fluorinated compounds or fluoro-surfactants including polytetrafluoroethylene resin, polymeric resins including polyamide resin, polyamide-epichlorohydrin resin, and mixtures and combinations thereof.

The burnthrough resistant layer can be directly or indirectly coated onto, or otherwise incorporated into a film by methods including, without limitation, roll coating, reverse roll coating, gravure coating, reverse gravure coating, transfer coating, spray coating, brush coating, dip coating, tape casting, blading, slot-die coating, deposition coating, etc. The burnthrough resistant layer can be applied to a film as a single layer or as multiple layers.

Commercially available burnthrough resistant films include, without limitation, TERFLAME 30® (Hutchinson Aerospace—formerly "Jehier SA", Chemille, France); INSULFAB® 2518 Triumph Insulation Systems LLC (Taylorsville, N.C.); NOMEX® XF (DuPont, Del.); FYRE-WRAP® Combi-Film Gil (Unifax LLC (Tonawanda, N.Y.), and other materials, (e.g., materials satisfying the requirements for BMS 8-396), etc.

When the burnthrough resistant material is incorporated onto or into a polymeric film to form a flame propagation resistant film, the polymeric film can be made from materials including, without limitation, polyesters, polyimides, polyetherketones, polyetheretherkeptones, polyvinylfluorides, polyamides, polytetrafluoroethylenes, polyaryl sulfones, polyester amides, polyester imides, polyethersulfones, polyphenylsulfides, ethylene chlorotrifluoroethylene, etc., and combinations thereof.

Commercially available examples of such films include, without limitation, polyester films sold as MYLAR® (DuPont, Wilmington, Del.); polyvinylfluoride films sold as TEDLAR® (DuPont, Wilmington, Del.); polyimide films sold as KAPTON® (DuPont, Wilmington, Del.); polyetheretherketone (PEEK) films sold as APTIV® (Vietrex plc., Lancashire, UK); polyetheretherketone films sold as KETASPIRE® (Solvay, Brussels, Belgium); ethylene chlorotrifluoroethylene films sold as HALAR® (Solvay, Brussels, Belgium), polyetherketoneketone (PEKK) films sold as APK (Lamark, N.J.), etc.

Further aspects of the present disclosure contemplate adding fire retardant additives to the burnthough resistant layer. Such additives can be provided as overcoats or coatings, with the additives including, without limitation, at least one of antimony-containing compounds, hydrated alumina-containing compounds, borates, carbonates, bicarbonates, inorganic halides, phosphates, sulfates, organic halogens, organic phosphates, etc.

The burnthrough resistant layer added to the floor panels, according to aspects of the present disclosure, can be present in any practical thickness that affords the coated floor panel with burnthrough resistant and/or other fire retardant properties that satisfy, for example and without limitation, U.S. Federal Regulations such as those found at 14 C.F.R. § 25.856 and part VII of Appendix F to 14 C.F.R. part 25. That is, 14 C.F.R. § 25.856, at least as early as the filing date of this application, sets forth the testing requirements needed to insure that the lower portion of an aircraft is protected by fuselage insulation that achieves a burnthrough time of at least 4 minutes, while having a heat flux of less than about 2.0 Btu/ft$^2$-sec. (2.27 W/cm$^2$). Such regulations have been deemed as necessary to insure, for example, the evacuation of an aircraft subjected to flames occurring on the exterior of an aircraft fuselage, with such flames potentially caused by, for example, fuel pooling during fueling, etc.

The floor panels comprising the burnthrough resistant layer, according to aspects of the present disclosure, are preferably floor panels used in aircraft, and are also useful as floor panels used in other vehicles including, terrestrial vehicles and marine or water borne vehicles, and even stationary structures such as buildings. The floor panels may be made from a metallic material or non-metallic material, or the floor panels may include an assembly of different combinations of metallic and/or non-metallic materials. Preferably, the floor panels are aircraft floor panels having a skin material over a core material wherein the skin/core assembly can be, without limitation: 1) a fiber composite skin over a metallic core; 3) a fiber composite skin over a non-metallic core; 3) a carbon composite skin over a non-metallic core; 4) a carbon composite skin over a metallic core, etc.

When the floor panel comprises a skin/metallic core assembly, further aspects of the present disclosure contemplate the metallic core including, without limitation, aluminum, an aluminum alloy, titanium, a titanium alloy, steel, etc. Since weight constraints are particularly important in aircraft, preferred metallic floor materials for aircraft include, without limitation, aluminum, an aluminum alloy, titanium, and/or a titanium alloy, or combinations thereof, etc.

When the floor comprises a skin/core assembly, further aspects of the present disclosure contemplate the skin material made from a fiber-containing material including, without limitation a carbon fiber, a boron fiber, a glass fiber, an aramid fiber, or the like. Further contemplated skin materials include phenolic resins, epoxy resins, acrylamide resins, with the resins preferably including a fiber-containing material.

Contemplated aircraft floor panels can possess acoustic or other sound dampening characteristics such that the core of contemplated floor panels can incorporate a sandwich structure including, for example, acoustic honeycomb panels used as the core for the floor assembly, with surfaces (e.g., upper and lower surfaces) of the honeycomb core covered by a skin material that can include the skin materials disclosed herein.

The floor panels disclosed herein can be made from any desired material including floor panels comprising a core material, such as, for example an acoustic core material, and further including an acoustic honeycomb core material, or a suitable open cell foam material, etc. The core material can be present as a honeycomb panel, with surfaces (e.g., upper and lower surfaces) of the honeycomb panel substantially covered with facing sheets, equivalently referred to as "skins". The present disclosure contemplates skins that can be made from the same or different material used to make the core material.

The materials selected for use as floor panels in the floor panel assemblies described herein can provide varying and desired degrees of sound attenuation or dampening that can result, for example and without limitation, from vibrations, especially when the floor panels and floor assemblies are integrated into vehicles and vehicle assemblies including, for example, aircraft. Such acoustic attenuation and noise reduction that are achieved by the disclosed floor panels and floor assemblies further provide the structural strength required of flooring. Additionally, by adding a fire retardant or fire-resistant layer that impedes burnthrough, the floor panels and floor assemblies disclosed herein reliably provide multiple functions and allow the resulting floor panels and floor assemblies to pass Federally (U.S.) mandated burnthrough requirements.

The structural robustness and noise attenuation of the floor panels and floor assemblies are assisted by employing panels having a honeycomb configuration. Honeycomb materials, including honeycomb material panels are available in varying thicknesses, cell sizes cell and panel shapes (e.g. cells typically substantially hexagonal in shape), and densities. According to aspects of the present disclosure, honeycomb panels used as the core of the floor panels are made from a variety of material including, without limitation, metals, plastics, composite materials, resins, and combinations thereof.

Useful metal honeycomb materials include, without limitation, aluminum, aluminum alloys, titanium, titanium alloys, etc., with overall weight and material density of such materials impacting their use for floor panel components on vehicles, and particularly on aircraft. Useful non-metallic honeycomb core panels can be made from a fiber-containing material, including, without limitation, carbon fibers, glass fibers, boron fibers, aramid fibers, para-aramid fibers, etc. The fibers can be incorporated into a matrix comprising a resin-based polymer such as, for example, an epoxy polymer system, a phenolic polymer system, a polyamide polymer system, an acrylamide polymer system, etc.

Commercially available honeycomb panels (e.g. from The Gill Corporation, Anglet, France) can comprise various cell sizes, cell geometries, thicknesses and densities. Examples of such products include Gillcore™ HA and HD honeycomb (Nomex® aramid fiber reinforced honeycomb coated with a heat resistant phenolic resin); Gillcore™ HK honeycomb (Kevlar® aramid fiber reinforced honeycomb coated with heat resistant phenolic resin), etc. Further honeycomb panels are available from Hexcel Corporation (Decatur, Ga.) under the tradenames HexWeb® HRP-C (fiberglass core); HexWeb® HDC (high density fiberglass core); HexWeb® HRP-C, (fiberglass core); HexWeb® 5052, 5056 (aluminum core); etc.

Commercially available floor panels incorporating honeycomb core panels include, without limitation, Gillfab® 4004A and 4004B Panels (unidirectional S-2 glass reinforced phenolic facings or "skins" with Nomex® honeycomb core); Gillfab 4009 Panel (unidirectional graphite reinforced epoxy facings or "skins" with Nomex® honeycomb core); Gillfab 4109 Panel (unidirectional carbon reinforced phenolic facings or "skins" with Nomex® honeycomb core); Gillfab® 4123, 4223, 4405A—Type 1, 4522 Panels (woven fiberglass cloth reinforced phenolic facings or "skins" with Nomex® honeycomb core); Gillfab 4505, 4605 Panels (unidirectional carbon/woven glass reinforced phenolic facings or "skins" with Nomex® honeycomb core); Gillfab 4523 Panel (fiberglass reinforced phenolic facings or "skins" with Nomex® honeycomb core); Gillfab 5065 Panel (unidirectional fiberglass reinforced epoxy facings or "skins" with aluminum honeycomb core), etc., (The Gill Corporation, Anglet, France).

According to further aspects, the skin that covers upper and/or lower surfaces (e.g., the exterior surfaces) of the honeycomb panel core to form a floor panel can be made from a metal or a non-metal material. When the skin is made from a non-metal, the material is preferably a fiber-containing composite material such as, for example, a fiberglass or carbon fiber composite material, including a carbon fiber reinforced plastic (CFRP). Metal skins including, without limitation thin skins of aluminum, aluminum alloy, titanium, and titanium alloy, etc. are further contemplated for use consistent with the teachings herein.

Advantages of incorporating burnthrough resistant materials and layers into the floor panels of aircraft not only satisfy regulatory burnthrough requirements, but satisfy such requirements while obviating the presence of separate fire retardant apparatuses and/or structures that have been previously located in the lower half of an aircraft (e.g. lower fuselage interiors, cargo compartments, cargo linings, etc.) for the purpose of satisfying such mandated burnthrough requirements. That is, according to presently disclosed aspects, separate use of fire blankets or other similar insulative materials can be obviated, or at least such insulative layers that may be desired for acoustic or thermal purposes would no longer require fire penetration resistant treatments, thus simplifying the various insulative layers and apparatuses. Obviating the need for fire retardant and burnthrough resistant properties from the insulative blankets positioned in the interior of the lower fuselage would lower cost, potentially reduce aircraft weight, realize fuel savings (further lowering operating cost), increase aircraft range, increase aircraft payload, simplify inspection, repair, replacement, etc.

FIG. 1 shows a perspective representative side view of an aspect of the present disclosure. As shown in FIG. 1, a floor assembly 10 includes a floor panel 12 that includes an internal support structure 12a. The internal support structure 12a can be solid, or can be a sandwich structure (as shown in FIG. 1), with the sandwich structure including, for example, an outer skin covering an acoustic panel, such as a honeycomb acoustic panel (as shown in FIGS. 1, 2, 3, and 4, etc.). Contemplated exemplary floor panels include, without limitation, floor panels complying with Boeing specification designations BMS 4-17 (having a fiberglass composite skin and a non-metallic core); BMS 4-23 (having a fiberglass composite skin and an aluminum core); BMS 4-20 (having a carbon composite skin and a non-metallic core); etc. As shown in FIG. 1, the floor panel 12 includes a support structure 12a, equivalently referred to herein as a "core". Support structure 12a includes support structure first (or "upper") surface 12b and a support structure second (or "lower) surface 12c. A skin layer 13a is shown covering the support structure first surface 12b. Skin layer 13b is shown covering the support structure second surface 12c. According to further aspects of the present disclosure, the skins (equivalently referred to herein as "skin layers") may substantially completely cover the core. According to other aspects, if desired, the skin layers may cover only portions of the core surfaces (e.g., portions of the internal support structure first and second surfaces).

FIG. 1 further shows a burnthrough resistant layer 14 that is positioned proximate to the skin layer 13b. As further shown, a thin adhesive layer 15 is positioned between the burnthrough resistant layer 14 and the skin layer 13b such that the burnthrough resistant layer is proximate to the skin layer 13b. An adhesive layer 15 adheres the burnthrough resistant layer 14 and the skin layer 13b. The adhesive layer 15 can include any adhesive including pressure sensitive adhesives that can be applied by spraying brushing, rolling, etc. or that can be applied as a film, layer, sheet, etc. As shown in FIG. 1, the floor panel therefore includes the core, the skin covering the exterior of the core, and a burnthrough resistant layer positioned proximate to the at least one outer skin covering, with the burnthrough resistant layer 14 in an exposed orientation and otherwise positioned on the exterior of skin layer 13b. Though not shown, present aspects contemplate the burnthrough resistant layer positioned proximate to skin layer 13a instead of skin layer 13b. In a still further contemplated aspect, the floor panel 12 can include at least one burnthrough resistant layer 14 located on exterior surface of both skin layers 13a and 13b. The floor panel 12 is shown engaging floor supports 17. The floor supports 17 can be floor beams or other useful supports for a floor panel (e.g., such floor supports 17 can directly or indirectly attach to a fuselage interior or other assembly or sub-assembly in an aircraft, other vehicle, stationary structure, etc.) and the floor supports can include part of the floor assembly 10.

FIG. 2A shows a perspective representative side view of an aspect of the present disclosure similar to that shown in FIG. 1, except that the floor assembly 20 shown in FIG. 2A that includes floor panel 22, further includes a burnthrough resistant layer 14 that is located between the internal support structure second surface 22c and the skin 23b. As shown, floor panel 22 includes an internal support structure 22a equivalently referred to herein as a "core". Internal support structure 22a includes an internal support structure first (or "upper") surface 22b and an internal support structure second (or "lower) surface 22c. A skin layer 23a is shown covering the support structure first surface 22b. Skin layer 23b is shown covering the support structure second surface 22c. According to this aspect as shown in FIG. 2A, a thin adhesive layer 15 adheres the burnthrough resistant layer 14 between the support structure second surface 22c and the skin 23b. Further aspects (not shown in FIG. 2A) contemplate that a separate adhesive layer would not be needed during the fabrication of the floor panel shown in FIG. 2A. According to still further aspects (not shown in FIG. 2A), the burnthrough resistant layer would incorporate an adhesive integrally in one layer.

FIG. 2B shows a perspective representative side view of an aspect of the present disclosure having a floor assembly 25 that includes floor panel 22 having an internal support structure 22a equivalently referred to herein as a "core".

Internal support structure 22a includes support structure first (or "upper") surface 22b and a support structure second (or "lower) surface 22c. A skin layer 23a is shown covering the support structure first surface 22b. A skin layer 24 is shown covering the support structure second surface 22c. As shown in FIG. 2B, a burnthrough resistant material is incorporated in (e.g. impregnated into, etc.) the skin layer 24. As shown in FIG. 2B, the floor panel includes the core, the skin covering the exterior of the core, and a burnthrough resistant material integral with at least one outer skin covering, with the burnthrough resistant material therefore in a layer that is exposed at an exterior surface of the floor panel. According to this aspect, burnthrough resistant material is provided to the floor panel and floor panel assembly within another existing layer, and is not provided as a discrete burnthrough resistant layer. Though not shown in FIG. 2B, present aspects contemplate the burnthrough resistant material incorporated into skin layer 23a instead of skin layer 24. In a still further contemplated aspect, the floor panel 22 can include burnthrough resistant material integrated into one or more (e.g., both) skin layers 23a and 24 Similar to the floor assembly 10 shown in FIG. 1, the floor assemblies 20, 25 shown in FIGS. 2A and 2B, respectively, illustrate a floor panel 22 engaging floor supports 17. The floor supports 17 can be floor beams or other useful supports for a floor panel (e.g., such floor supports 17 can directly or indirectly attach to a fuselage interior or other assembly or sub-assembly in an aircraft, other vehicle, stationary structure, etc.) and the floor supports can include part of the floor assembly.

FIG. 3 is a perspective elevated and partially exposed view showing aspects of the floor panel 12 shown in FIG. 1, but without the presence of the burnthrough resistant layer 14. The floor panel shown in FIG. 3 includes an internal support structure 12a including internal support structure first (or "upper") surface 12b and an internal support structure second (or "lower") surface 12c. A skin layer 13a is shown covering the internal support structure first surface 12b. A skin layer 13b is shown covering the internal support structure second surface 12c. A section of the skin layer 13a has been removed to provide an exposed illustration and view of the internal support structure 12a that comprises a honeycomb panel 18.

FIG. 4 shows a cross-sectional side view of the floor panel shown in FIG. 3, with the internal support structure 12a comprising a honeycomb panel 18 (equivalently referred to herein as a "honeycomb core") having upper and lower surfaces that are substantially covered by skin layers 13a and 13b.

FIG. 5 shows an aircraft 50 having a fuselage section 52. FIG. 6 is a cross-sectional view of a cabin 62 located inside of or interior to fuselage 52, with the view taken along line 6-6 as shown in FIG. 5. Cabin 62 has an interior side wall panel 63, with a layer of fuselage insulation 64 sandwiched between the interior side wall panel 63 and the fuselage 52. Floor assembly 66 is attached to a side wall assembly and is further in communication with and joined to the interior side wall panel 63 or other structures that join the interior side wall panel to the fuselage, or joined to the fuselage interior itself, etc. Floor assembly 66 comprises the floor assembly of the type shown as 10, 20, 25 in FIGS. 1, 2A, and 2B. The floor assembly 66 further comprises the floor panel 12, 22 as shown in FIGS. 1, 2A, 2B, 3 and 4, respectively. The upper cabin portion 65 of cabin 62 (e.g. the upper portion 65 of the cabin 62 that is located above the floor assembly 66) is further equivalently referred to as a "passenger compartment", or "passenger cabin". The interior of the fuselage further includes a lower fuselage compartment 68 equivalently referred to herein as a cargo compartment located beneath the floor assembly 66 and residing in the lower cabin portion 67 of the cabin 62. As shown in FIG. 6, cabin 62 has an interior side wall panel 63, and a layer of cargo compartment lining system 69 that can cover the fuselage insulation 64.

FIG. 7 shows a view within the lower fuselage or cargo compartment 68, of the underside of floor assemblies 10 (as shown in FIG. 1) including floor panels 12 located proximate to and secured to structural floor supports 17 and structural floor cross-supports 17a. The cross-supports 17a can also serve as supports to which seating assemblies are attached and can include, for example, floor track systems. The exterior of the floor panels 12 shown in FIG. 7 includes the burnthrough resistant layer 14 shown in FIGS. 1, 2 and 6, for example. Taken together, floor supports 17 and floor cross supports 17a form a floor support system.

FIG. 8 is a flowchart outlining a method according to aspects of the present disclosure. FIG. 8 outlines a method 80 for inhibiting fire penetration into an aircraft compartment, with the method comprising installing 82 a floor assembly into an aircraft fuselage interior, and inhibiting 84 fire penetration and burnthrough into the aircraft compartment. According to aspects of the present disclosure, the floor assembly includes a floor panel having an internal support structure, skins configured to substantially cover upper and lower surfaces of the internal support structure, and a burnthrough resistant layer to form a burnthrough resistant floor assembly including burnthrough resistant floor panels, aspects of which are shown at least in FIGS. 1-4 and 6-7 and otherwise described herein.

FIG. 9 is a flowchart outlining another method according of aspects of the present disclosure. FIG. 9 outlines a method 90 for making a burnthrough resistant floor panel including applying 92 a burnthrough resistant layer to a floor panel and forming 94 the burnthrough resistant floor panel. According to aspects of the present disclosure, the floor assembly includes a floor panel having an internal support structure, a skin configured to substantially surround the internal support structure to form a burnthrough resistant floor assembly including burnthrough resistant floor panels, aspects of which are shown in FIGS. 1-8 and described herein.

When tested without including the presently disclosed burnthrough resistant layers, floor panels having certain combinations of thicknesses ranging from about 0.25 inch to about 1.0 inch, and having a density ranging from about 0.4.0 lb/ft$^2$ to about 1.10 lb/ft$^2$ did not pass the burnthrough tests outlined in the FAR requirements set forth as FAR 25-856(b). That is, to pass the FAR requirements for burnthrough testing, a floor panel must have a certain thickness combined with a certain density (e.g., sometimes referred to as fire-hardening). Such floor panel thicknesses and densities formerly required to pass the FAR burnthrough requirements result in added weight as compared to the floor panels and floor assemblies now made possible according to aspects of the present disclosure.

When presently disclosed burnthrough resistant layers having a thickness ranging from about 0.0025 inch to about 0.008 inch were applied to the aforementioned floor panels that had combined thickness and densities that did not pass the FAR burnthrough requirements, these floor panels that were modified with the presently disclosed burnthrough resistant layers did pass and burnthrough testing requirements and satisfy the FAR regulations and passed the circumscribed testing protocol set forth, for example, in 14 C.F.R. § 25.856 (2017). In other words, the modified panels according to presently disclosed aspects, resisted backside heat flux values of less than about 2.0 BTU/ft²/sec. with a burnthrough rate of from about at least 4 minutes to about 5 minutes. Additional present testing revealed that floor panels having a reduced thicknesses and/or reduced density now pass the FAR burnthrough requirements when the presently disclosed burnthrough resistant layers are incorporated into such floor panels.

Without being limiting, a useful floor panel (e.g., skin/core floor panel) was shown to have a useful density and thickness combination, including floor panels having an overall density (areal weight) of at least about 0.64 lb/ft² and a skin thickness of about 0.020 inch. Another useful (skin/core) floor panel was shown to have an overall density (areal weight) of at least about 0.40 lb/ft² and a skin thickness of about 0.015 inch. A further useful (skin/core) floor panel was shown to have an overall density (areal weight) of at least about 1.10 lb/ft² and a skin thickness of about 0.030 inch.

Example 1

Burnthrough Testing for BMS 4-17—Fiberglass Composite Skin/Non-Metallic Core

A first sample of BMS 4-17 floor panel having a fiberglass composite skin and a non-metallic honeycomb core comprising aramid fiber paper incorporating a phenolic resin did not pass the Federal requirements for "burnthrough" testing. The floor panel had a density (areal weight) of 1.10 lb./ft²; a skin thickness of 0.030 inch; and an overall panel thickness ranging from about 0.039 inch to about 0.41 inch A second sample of the same BMS 4-17 floor panel was modified by adding the presently disclosed burnthrough resistant material layer and again tested according to the testing protocol set forth in FAA Aircraft Materials Fire Test Handbook, Chapter 24. A burnthrough resistant layer having an average thickness ranging from about 0.0025 inch to about 0.008 inch was adhered to the outer surface of the skin The BMS 4-17 floor panel modified with the burnthrough resistant layer passed the testing protocol, showing torch heating burnthrough in excess of 4 mins. resisting a heat flux of less than 2.0 BTU/ft²/sec. to satisfy FAA guidelines/regulations.

Example 2

Burnthrough Testing for BMS 4-23—Fiberglass Composite Skin/Aluminum Core

A sample of BMS 4-23 floor panel having a fiberglass composite skin and an aluminum honeycomb core did not pass the Federal requirements for "burnthrough" testing. The floor panel had a density (areal weight) of 0.64 lb./ft²; a skin thickness of 0.020 inch; and an overall panel thickness ranging from about 0.039 inch to about 0.41 inch. A second sample of the same BMS 4-23 floor panel was modified by adding the presently disclosed burnthrough resistant layer and again tested according to the testing protocol set forth in FAA Aircraft Materials Fire Test Handbook, Chapter 24. A burnthrough resistant layer having an average thickness ranging from about 0.0025 inch to about 0.008 inch was adhered to the outer surface of the skin. The BMS 4-23 floor panel modified with the burnthrough resistant layer passed the testing protocol, showing torch heating burnthrough in excess of 4 mins. resisting heat flux of less than 2.0 BTU/ft²/sec. to satisfy FAA guidelines/regulations.

Example 3

Burnthrough Testing for BMS 4-20—Carbon Composite Skin/Non-Metallic Core

A sample of BMS 4-20 floor panel having a fiberglass composite skin and non-metallic honeycomb core comprising aramid fiber paper incorporating a phenolic resin did not pass the Federal requirements for "burnthrough" testing. The floor panel had a density (areal weight) of 0.40 lb./ft²; a skin thickness of 0.015 inch; and an overall panel thickness ranging from about 0.039 inch to about 0.41 inch. A second sample of the same BMS 4-20 floor panel having a fiberglass composite skin and a non-metallic core was modified by adding the presently disclosed burnthrough resistant layer and again tested according to the testing protocol set forth in FAA Aircraft Materials Fire Test Handbook, Chapter 24. A burnthrough resistant layer having an average thickness ranging from about 0.0025 inch to about 0.008 inch was adhered to the outer surface of the skin. The BMS 4-20 floor panel modified with the burnthrough resistant layer passed the testing protocol.

The present disclosure further contemplates the use of the disclosed floor panels and floor assemblies comprising a burnthrough resistant layer, and the use of methods for making floor panels and floor assemblies having a burnthrough resistant layer in the manufacture of objects, including stationary structures including, without limitation buildings, supports, etc. The present disclosure further contemplates the use of the disclosed floor panels and floor assemblies comprising a burnthrough resistant layer, and methods for making and installing floor panels and floor assemblies having a burnthrough resistant layer in the manufacture of vehicles, including manned and unmanned aircraft, manned and unmanned spacecraft, manned and unmanned rotorcraft, manned and unmanned terrestrial vehicles (e.g., cars, trucks, buses, trains, etc.), manned and unmanned hovercraft, manned and unmanned surface water borne vehicles, manned and unmanned sub-surface water borne vehicles, and satellites, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A burnthrough resistant floor panel comprising:
   an internal support structure having an internal support structure first surface and
   an internal support structure second surface;
   at least one skin, said at least one skin comprising a skin thickness, said at least one skin configured to substantially cover the internal support structure first surface and said at least one skin further configured to substantially cover the internal support structure second surface to form a floor panel, said at least one skin having an exterior skin surface, said skin further comprising a fiber-containing composite material, said fiber-containing composite material comprising at least one of: a carbon fiber, a boron fiber, a glass fiber, and an aramid fiber, said fiber-containing composite material further comprising at least one of: a phenolic resin; an, epoxy resin; and an acrylamide resin;
   a burnthrough resistant material impregnated throughout the skin thickness of the at least one skin, said burnthrough resistant material resisting a backside heat flux of less than about 2.0 BTU/ft$^2$/sec for at least from about 4 mins to about 5 mins;

an adhesive layer disposed on at least one side of the at least one skin, said adhesive layer comprising an adhesive material, said adhesive material a fire retardant additive; and wherein the burnthrough resistant floor panel has a floor panel density, said floor panel density ranging from about 0.4 to about 1.10 lbft$^2$.

2. The burnthrough resistant floor panel of claim 1, wherein the internal support structure comprises a honeycomb panel.

3. The burnthrough resistant floor panel of claim 1, wherein the burnthrough resistant material comprises a ceramic paper.

4. The burnthrough resistant floor panel of claim 1, wherein the burnthrough resistant material comprises at least one of: an inorganic polymer film material and a ceramic material.

5. The burnthrough resistant floor panel of claim 1, wherein the internal support structure is made from a material comprising at least one of: a non-metallic core and an aluminum core.

6. The burnthrough resistant floor panel of claim 5, wherein the non-metallic core comprises an open cell foam.

7. The burnthrough resistant floor panel of claim 1, wherein the floor panel has a thickness ranging from about 0.25 inch to about 1 inch.

8. A fuselage comprising the burnthrough resistant floor panel of claim 1.

9. An aircraft comprising the burnthrough resistant floor panel of claim 1.

10. The burnthrough resistant floor panel of claim 1, wherein the burnthrough resistant material is integrated throughout the thickness of the at least one skin.

11. The burnthrough resistant floor panel of claim 1, wherein the burnthrough resistant material and the at least one skin are co-cured.

12. The burnthrough resistant floor panel of claim 1, wherein the fiber-containing composite material comprises a carbon fiber reinforced plastic.

13. The burnthrough resistant floor panel of claim 1, wherein the adhesive material comprises an adhesive material requiring no curing.

14. The burnthrough resistant floor panel of claim 1, wherein the adhesive material comprises a pressure sensitive adhesive material.

15. The burnthrough resistant floor panel of claim 1, wherein the adhesive material comprises at least one of: a polyester-based adhesive, a polyvinyl fluoride-based adhesive, and a silicone-based adhesive.

16. The burnthrough resistant floor panel of claim 1, wherein the at least one skin incorporates integrally the adhesive layer.

17. A burnthrough resistant floor assembly comprising:
a floor panel, said floor panel comprising:
an internal support structure having a first internal support structure surface and a second internal support structure surface;
at least one skin configured to substantially cover the first internal support structure surface and the second internal support structure surface;
a burnthrough resistant material impregnated into the at least one skin, said at least one skin further comprising a fiber-containing composite material, said fiber-containing composite material comprising at least one of: a carbon fiber; a boron fiber; a glass fiber; and an aramid fiber, said fiber-containing composite material further comprising at least one of: a phenolic resin; an, epoxy resin; and an acrylamide resin;
an adhesive layer disposed on at least one side of the at least one skin, said adhesive layer comprising an adhesive material, said adhesive material comprising a fire retardant additive;
wherein the floor assembly resists a backside heat flux of less than about 2.0 BTU/ft$^2$/sec for at least from about 4 mins to about 5 mins; and
wherein the burnthrough resistant floor panel has a floor panel density, said floor panel density ranging from about 0.4 to about 1.10 lbft$^2$.

18. A fuselage comprising the burnthrough resistant floor assembly of claim 17.

19. An aircraft comprising the burnthrough resistant floor assembly of claim 17.

20. The burnthrough resistant floor assembly of claim 17, wherein the burnthrough resistant material is integrated throughout the thickness of the at least one skin.

21. The burnthrough resistant floor assembly of claim 17, wherein the burnthrough resistant material and the at least one skin are co-cured.

22. The burnthrough resistant floor assembly of claim 17, wherein the fiber-containing composite material comprises a carbon fiber reinforced plastic.

23. A method for inhibiting fire penetration into an aircraft cabin, the method comprising:
providing a floor assembly into an aircraft fuselage interior, said floor assembly comprising:
a burnthrough resistant floor panel, said burnthrough resistant floor panel comprising:
an internal support structure having a first internal support structure surface and a second internal support structure surface;
at least one skin configured to substantially cover at least one of the first internal support structure surface and the second internal support structure surface, said at least one skin comprising a burnthrough resistant material, said burnthrough resistant material impregnated into the at least one skin, said skin further comprising a fiber-containing composite material, said fiber-containing composite material comprising at least one of: a carbon fiber; a boron fiber; a glass fiber; and an aramid fiber, said fiber-containing composite material further comprising at least one of: a phenolic resin; an, epoxy resin; and an acrylamide resin;
an adhesive layer disposed on at least one side of the at least one skin, said adhesive layer comprising an adhesive material, said adhesive material comprising a fire retardant additive;
wherein the burnthrough resistant floor panel resists a backside heat flux of less than about 2.0 BTU/ft$^2$/sec for at least from about 4 mins to about 5 mins;
wherein the floor assembly obviates the presence of separate fire retardant apparatuses located in the lower half of an aircraft; and
wherein the burnthrough resistant floor panel has a floor panel density, said floor panel density ranging from about 0.4 to about 1.10 lbft$^2$.

24. The method of claim 23, wherein the burnthrough resistant material is impregnated throughout the thickness of the at least one skin.

25. A method of making a burnthrough resistant floor panel, the method comprising:

provinding an internal support structure further comprising an internal support structure first surface and an internal support structure second surface;

providing at least one skin, said at least one skin comprising a burnthrough resistant material impregnated into the at least one skin, said at least one skin further comprising a fiber-containing composite material, said fiber-containing composite material comprising at least one of: a carbon fiber; a boron fiber; a glass fiber; and an aramid fiber, said fiber-containing composite material further comprising at least one of: a phenolic resin; an, epoxy resin; and an acrylamide resin, said at least one skin further comprising an adhesive layer disposed on at least one side of the at least one skin, said adhesive layer comprising a fire retardant additive, substantially covering at least one of the internal support structure first surface and an internal support structure second surface with the skin material to form a burnthrough resistant floor panel; and wherein the burnthrough resistant floor panel resists a backside heat flux of less than about 2.0 BTU/ft$^2$/sec for at least from about 4 mins to about 5 mins; and wherein the burnthrough resistant floor panel has a floor panel density, said floor panel density ranging from about 0.4 to about 1.10 lbft$^2$.

26. The method of claim 25 further comprising:

orienting the at least one skin proximate to at least one of the support structure first surface and a support structure second surface.

27. The method of claim 25, wherein the burnthrough resistant material is impregnated throughout the thickness of the at least one skin.

* * * * *